(12) United States Patent
Kerai et al.

(10) Patent No.: US 6,531,845 B2
(45) Date of Patent: Mar. 11, 2003

(54) BATTERY CHARGING

(75) Inventors: Kanji Kerai, London (GB); Kalle Tuulos, Turku (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/864,273

(22) Filed: May 25, 2001

(65) Prior Publication Data

US 2002/0005707 A1 Jan. 17, 2002

(30) Foreign Application Priority Data

May 26, 2000  (GB) ............................... 0012946

(51) Int. Cl.⁷ ................................................. H02J 7/00
(52) U.S. Cl. ....................................................... 320/107
(58) Field of Search ................................. 320/106, 107, 320/110

(56) References Cited

U.S. PATENT DOCUMENTS

| | | | |
|---|---|---|---|
| 5,371,453 A | 12/1994 | Fernandez | 320/136 |
| 5,592,528 A | 1/1997 | Nelson et al. | 324/538 |
| 5,814,969 A * | 9/1998 | Banyas | 320/112 |
| 6,087,804 A * | 7/2000 | Suda | 320/106 |
| 6,118,251 A * | 9/2000 | Atwater | 320/131 |
| 6,184,652 B1 | 2/2001 | Yang | 320/110 |
| 6,184,660 B1 * | 2/2001 | Hatular | 320/139 |
| 6,211,649 B1 | 4/2001 | Matsuda | 320/115 |

FOREIGN PATENT DOCUMENTS

| | | | |
|---|---|---|---|
| EP | 1085400 | 3/2000 | ............ G06F/1/26 |
| GB | 2 286 732 | 8/1995 | |
| GB | 2 293 283 | 3/1996 | |
| JP | 200020175 | 1/2000 | ............ G06F/1/26 |
| JP | 200020176 | 1/2000 | ............ G06F/1/26 |
| JP | 200029544 | 1/2000 | ............ G05F/1/00 |
| JP | 2000139032 | 5/2000 | ............ H02J/7/00 |
| JP | 2000165513 | 6/2000 | ............ H04M/1/72 |

\* cited by examiner

*Primary Examiner*—Edward H. Tso
*Assistant Examiner*—Pia Tibbits
(74) *Attorney, Agent, or Firm*—Antonelli, Terry, Stout & Kraus, LLP

(57) ABSTRACT

A battery charging circuit is described in which power is derived from a communications port such as a USB interface (22) and is supplied to a rechargeable battery of a communications device. The communications device, which may be a mobile radio telephone, can be charged from the power supply or internal battery of a laptop computer equipped with a USB port and connected thereto with a suitable cable thereby avoiding the need for a user to carry a dedicated battery charger for the radio telephone.

44 Claims, 6 Drawing Sheets

BATTERY CHARGING

BACKGROUND OF THE INVENTION

1. Field of the Invention

The present invention relates to a battery powered device incorporating a communication port, particularly although not exclusively a USB interface.

2. Description of the Prior Art

Customarily, hand held electronic devices such personal digital assistants (PDA), and cellular handsets have been powered by a rechargeable battery, the term battery being intended to encompass a collection of one or more cells. As a consequence, it is necessary for the user of such a device to recharge the battery regularly using a dedicated charger, always assuming a source of electrical power is publically available. Where a user possesses more than one such device and perhaps a laptop computer, it is necessary to carry a corresponding number of chargers. Typically, battery chargers are heavy, bulky and inconvenient to transport due to their trailing leads and connectors. Furthermore, where a user is traveling abroad, even should the charger prove compatible with the local electrical power supply, a power outlet adapter will almost certainly be necessary adding to expense and further inconveniencing the user.

SUMMARY OF THE INVENTION

It is thus an object of the present invention to overcome the disadvantages set out above and to further provide a device which permits a user to remove the need to carry a plurality of chargers and adapters when traveling. It is a still further object of the invention to permit the charging of a device in the absence of a locally available electrical supply.

Thus, according to one aspect of the present invention there is provided a battery powered device including a communications port and a charging circuit connectable to a battery, the charging circuit having a further connection to the communications port wherein the port, in use, provides power to the charging circuit.

Although the port may include a power line such as is found, for example, in a USB port, preferably the charging circuit obtains power from the data and/or control lines. Conveniently, the connection to the charging circuit is switched such that the controller or processor may make or break the connection in accordance with instructions received via a user interface of the device. Such instructions could arise from the detection of the onset of a communication over the data line in particular where this is a source of power. By disconnecting the charging circuit from the data line, the capacitance of the line is reduced and the data rate of the port is substantially maintained. It may also be appropriate to break the connection where an additional power supply is connected to a dedicated input to the charging circuit. By disconnecting the charging circuit from the port in such circumstances, the risk of over charging the battery is reduced. The device may also include means for providing data indicative of the status of a battery connected to the battery charger.

In accordance with a further aspect of the invention, there is provided a battery powered device including a communications port and a charging circuit connectable to a battery, the charging circuit being connected to at least one data and/or control line of said port, whereby power is received by said circuit during operation of said at least one line.

Particularly in the case of a so-called USB communications port, it is possible to deliver power to a battery charging circuit during communication activity between the device and a further device connected via suitable cabling thereto. Such communication activity may include the transfer of data and/or control signals. A switch may be provided to control the delivery of power to the charging circuit where the transmission conditions of the port dictate.

According to another aspect of the present invention, there is provided a method of charging a battery powered device containing a communications port, said device further including a charging circuit connectable to a battery, the method comprising connecting said charging circuit to at least one data and/or control line during delivery of data and/or control signals to said port whereby power is supplied from said at least one line to the charging circuit.

BRIEF DESCRIPTION OF THE DRAWINGS

In order to understand more fully the invention, several embodiments thereof will now be described by way of example and with reference to the accompanying drawings, in which.

DETAILED DESCRIPTION OF THE INVENTION

Figure 1:
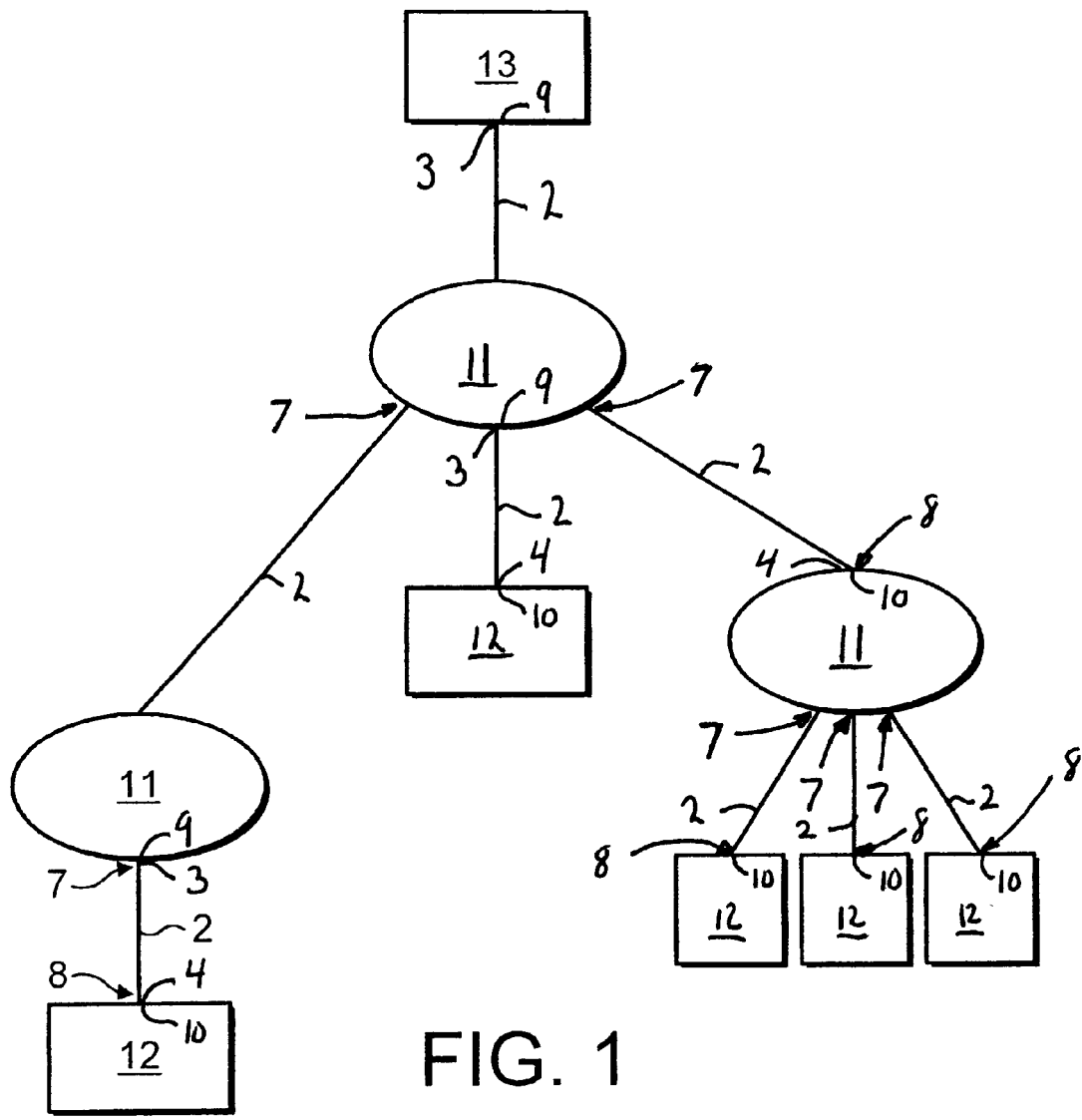
FIG. 1 is a block diagram illustrating the topology of the known USB serial interface.

Referring now to FIG. 1 in particular, there is shown a typical bus topology 1 of a well known serial interface standard, namely the USB interface, details of which may be found in the Universal Serial Bus Specification Revision 1.1.

The USB standard provides that in addition to carrying data bi-directionally, a USB cable 2 must also supply electrical power unidirectionally. The power and data passes through pre-defined terminals or pin-outs provided on a standardised plugs 3,4 on each free end 5,6 of the USB cable 2. The plugs 3,4 are defined in the standard as having different forms at upstream and downstream ends 7,8. Each plug 3,4 can mate only with a complementary shaped receptacle or port 9,10 provided in the USB devices 11,12 to be connected. Thus, the standard ensures that a cable 2 can only be connected to provide power from an upstream port 9 to a downstream port 10. The USB standard further provides the device 11 may have its own power supply. Such a device is known as a self-powered device 11. A device 12 which relies exclusively on power supplied from the upstream device or hub is known as a bus-powered device. Device 12 is a bus-powered device. A device may provide only a function, in which case it is defined as a node and has an upstream connection only, or it may be hub to which further USB devices (or hubs) may be connected downstream. A hub may also provide a function. The above standard further defines a root hub 13 from which all downstream connections depend. The root hub 13 forms part of a host that is normally a personal computer.

Figure 2:
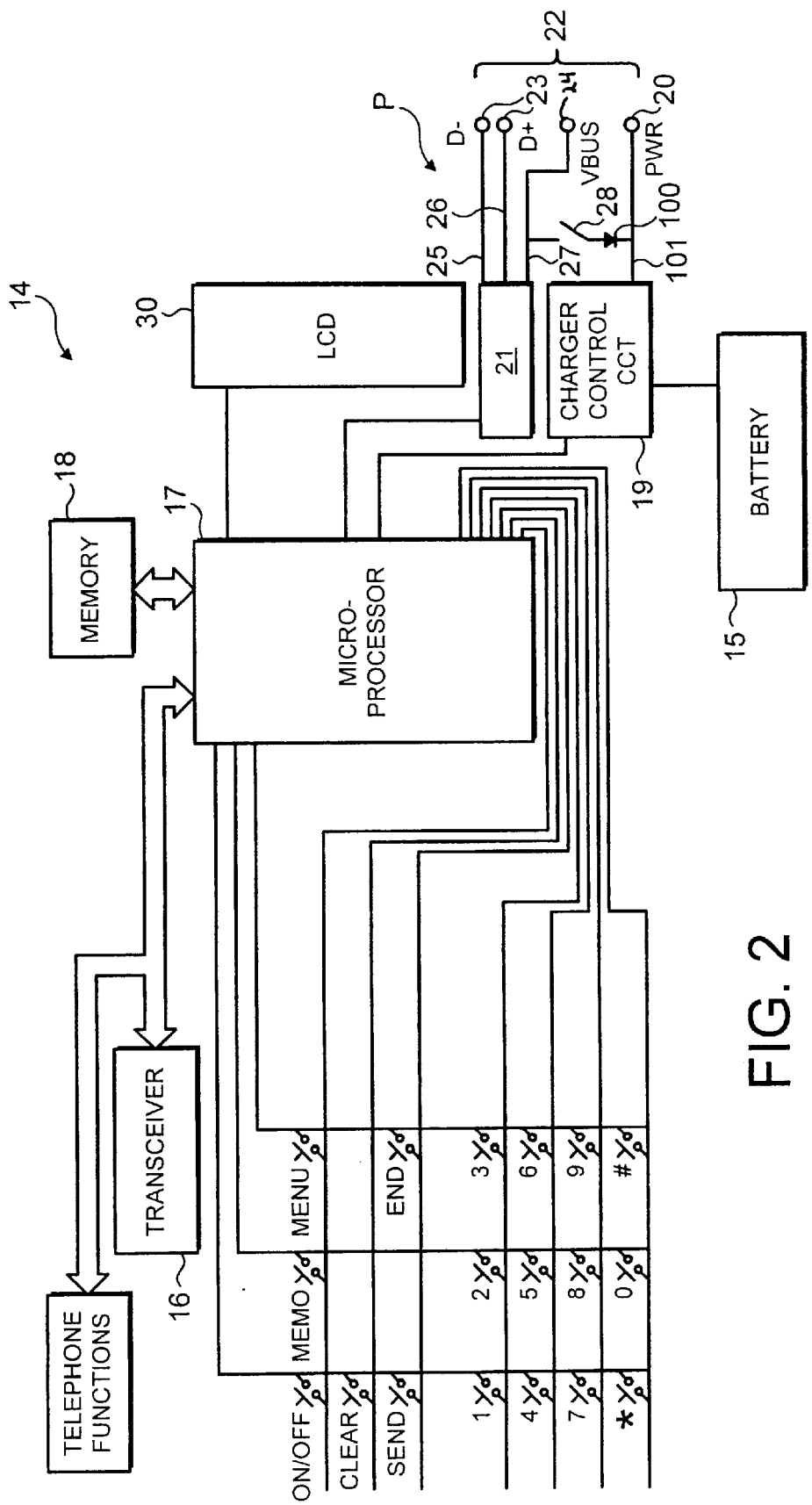
FIG. 2 is a block diagram of a battery powered radio telephone handset according to the present invention.

The USB specification was motivated, at least in part, by the desire to integrate telephony with personal computers. Thus, FIG. 2 shows a portable radio telephone 14 powered by a rechargeable battery pack 15. The telephone 14 includes a transceiver 16 and all the other features conventionally found in a cellular telephone, as shown schematically in FIG. 2. Since these aspects of the telephone 14 are not directly relevant to the present invention, no further details will be given here, except to say that a microprocessor 17 is employed to control all the basic functions of the telephone 14 and to control the keypad and display functions. The telephone 14 also comprises a memory unit 18 for storing user defined data such as telephone numbers in a subscriber number index, or identify codes for telephone banking systems. A battery charger control circuit 19 is also included in the telephone 14. This circuit 19 delivers power to the rechargeable battery 15. In a conventional manner, external power for supplying charge to the battery 15 is provided via a charger jack 20 located in the housing of the telephone.

The telephone 14 further incorporates a USB interface or port shown generally as P. The USB interface P comprises a connector 22 having data 23, power 24 and ground pins or terminals. The connector 22 is provided in the handset housing to which a downstream plug of a USB cable is connectable in use. A pair of conductors 25,26 carry differential data signals D− and D+ between the data pins 23 of the connector 22 and the USB interface ASIC 21 mounted on the handset PCB. The interface ASIC 21 is suitably programmed to provide the benefits of USB functionality to the handset. In addition, ground connection (not shown) is made from the ground pin of the connector 22 to the PCB.

A conductor 27, which carries power signals (Vbus) from the power pin 24 of the connector 22 to the Interface ASIC 21, is also connected via a switch 28 in series with a diode 100 to a conductor 101 connecting the charger jack 20 to the charger control circuit 19. The switch 28 is under the control of the interface ASIC 21 whilst the diode 100 prevents power from being supplied in an upstream direction via the connector 22, in accordance with the above USB standard. It will also be appreciated that in addition to the above-described connections there will exist further non-illustrated connections with and between the above-described components and other circuit elements of the handset 14. These additional connections, to the extent that they are directed to providing conventional known functions of a radio telephone 14, are not described in further detail.

Figure 7A:
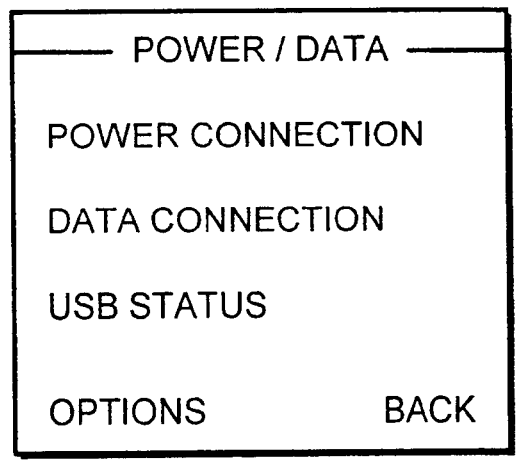
FIG. 7a is a view of a display of the handset of FIG. 2 showing a menu of a user interface.

In use, a user is able to select, via a menu (see FIG. 7a) provided on an otherwise conventional user interface (UI) display 30 of the handset 14, one of a number of modes of operation of the power and data transfer connections. However, before the UI permits these modes to be selected, the handset USB connector 22 must be connected via a USB cable 2 to a USB hub such as a laptop computer 29. Once connected, the interface ASIC 21 detects the presence of a USB cable 2 connection to the data terminals D+/D− 23 and signals this fact via the UI to the user. The interface ASIC 21 is also in receipt of a signal indicative of the state of charge of the battery 15. Whether the interface ASIC 21 closes the switch 28 and thereby connects Vbus to the battery 15 via the charging circuit 19 will depend on the mode selected by the user. It is immaterial with respect to the charger control circuit 19, what source of power is being used.

In a first mode, both data 23 and power 24 transfer connections are enabled. In a second mode the data connection 23 only is enabled, although a further feature may be operative in this mode in which the charger control circuit 19 continually monitors the state of the handset battery 15 and in the event that the charge falls below an acceptable level prompts the user via the UI display 30 to enable the power connection 24 to the handset 14 and thereby increase the charge of the handset battery 15. In a third (default) mode, the power connection 24 only is enabled.

Figure 3:
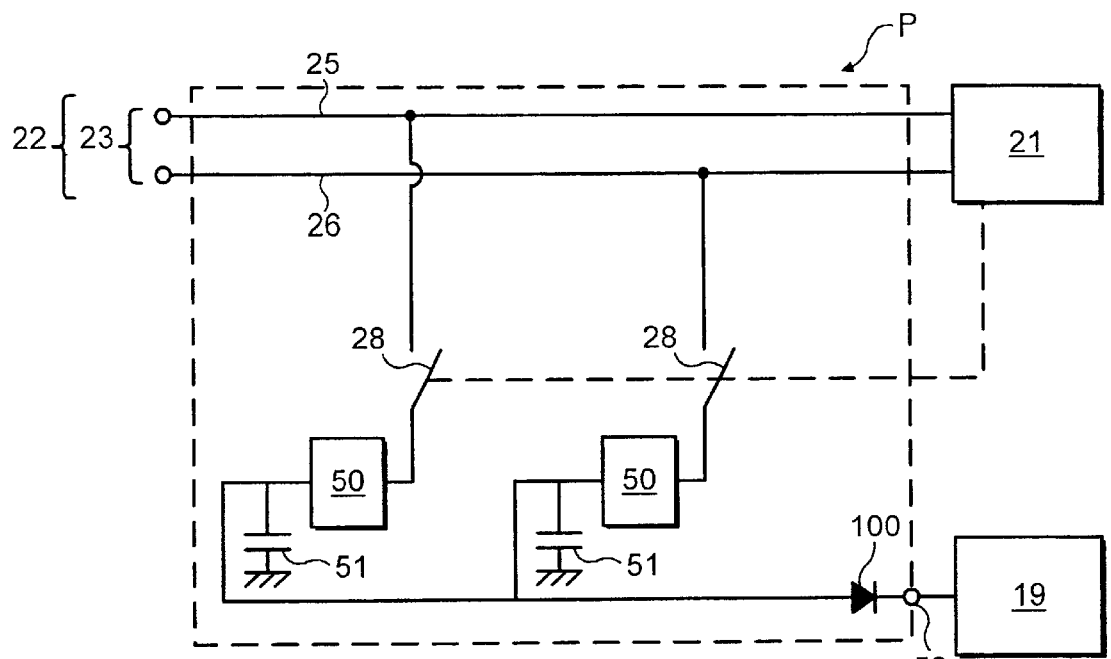
FIG. 3 is a diagrammatic view of a port according to a further embodiment of the invention.
Figure 6:
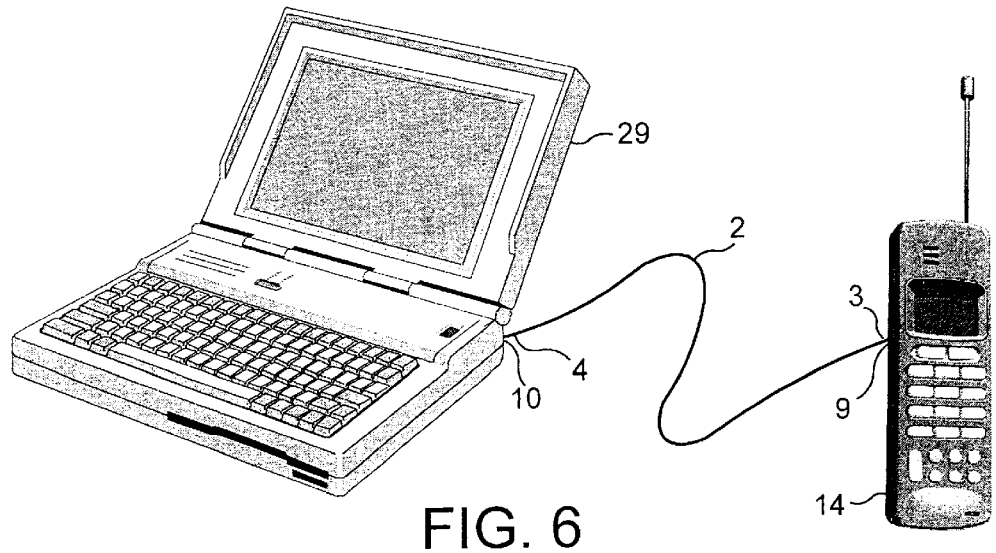
FIG. 6 is a diagram showing the radio telephone handset of FIG. 2 connected to a laptop computer.
Figure 7B:
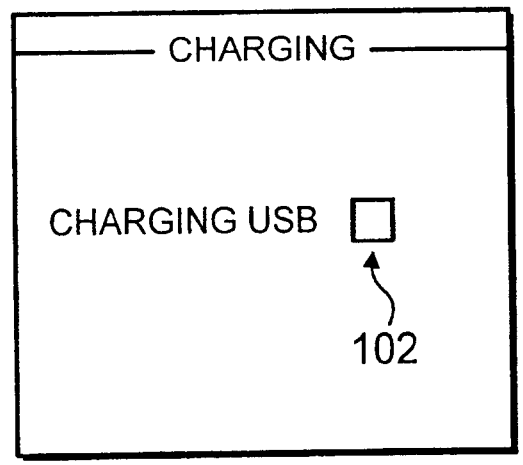
FIG. 7b is a similar view showing a simplified menu.
Figure 8:
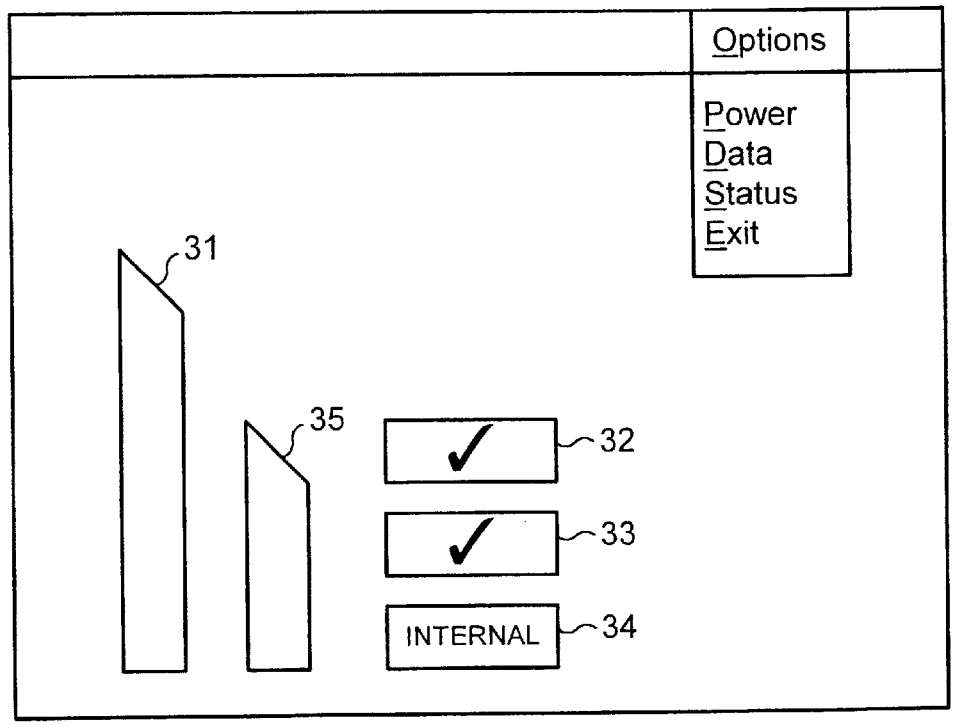
FIG. 8 is a view of a display of the laptop computer of FIG. 7 showing a menu of a software application.

To facilitate both ease of use and the minimization of any changes to the UI software, FIG. 7b shows a simplified menu of the user interface which may be displayed as an alternative to the above described menu on the display 30 of the handset 14. This simplified menu provides a single option 102 of allowing charging of the handset battery 15 via the USB connector 22. However, this option is active only when a USB connection is present and no power is being supplied via the charger jack 20.

Where the handset 14 is connected to a laptop computer 29 shown in FIG. 6 via the USB connector 22, as shown in FIG. 3, then further functionality may be provided in the form of a software application residing on the laptop computer 29 and utilizing the full capability of the USB interface protocol to communicate with the handset 4 over the USB cable 2. Thus, the application software may, through a suitable graphical user interface (GUI) provide control of the battery charge and data communication connections with the handset. FIG. 8 shows a laptop computer display on which a graphical indication 31 of the state of charge of the handset battery charge is given. In addition, there are displayed icons 32,33 indicating that both a data and a power connection exist between the handset 14 and the laptop computer 29. A further icon 34 indicates that the laptop computer is operating on its own internal batteries rather than on publically available electrical power. Hence the display further includes a bar graph 35 indicative of the state of charge of the laptop's own battery. In use, a user may select, using conventional point and clock operations with a mouse, various options for the supply of power and transfer of data with the handset. Most conveniently, the application will provide a set of operation modes selectable by the user and similar to those provided by the handset UI.

Thus in a first mode, both data and power transfer connections are enabled but with the safeguard that where the laptop computer 29 is detected as operating on internal battery power, the power connection is terminated when the battery charge of the laptop computer falls below a preselected level. This feature guards against the laptop computer battery becoming completely discharged.

In a second mode, the data connection only is enabled. Although a further feature may be enabled in this mode that continually monitors the state of the handset battery 15. Consequently, in the event that the handset battery charge falls below an acceptable level, the laptop computer 29 prompts the user, via a pop-up display, to connect the power connection to the handset and thereby increase the charge of the handset battery.

In a third mode, the power connection only is enabled although again the feature of preventing discharge of the laptop computer battery is provided to end the connection when the laptop computer battery charge falls below a predetermined level.

To provide for emergencies where it may be necessary to charge the handset battery 15 even at the expense of the laptop computer battery, there is further included an override function in each of the three modes that maintains the power connection. It will be appreciated that the existence of the power connection does not imply that power will be continuously transferred from the laptop computer. Indeed, the charging circuit of the handset continually monitors the handset battery 15 and provides a signal indicative of the level of charge to the charger control circuit 19. Thus, should the handset battery 15 reach a satisfactory level of charge, the charger control circuit 19 will cause the switch 28 to open preventing further depletion of the laptop computer battery and equally preventing overcharging of the handset battery.

Figure 9:
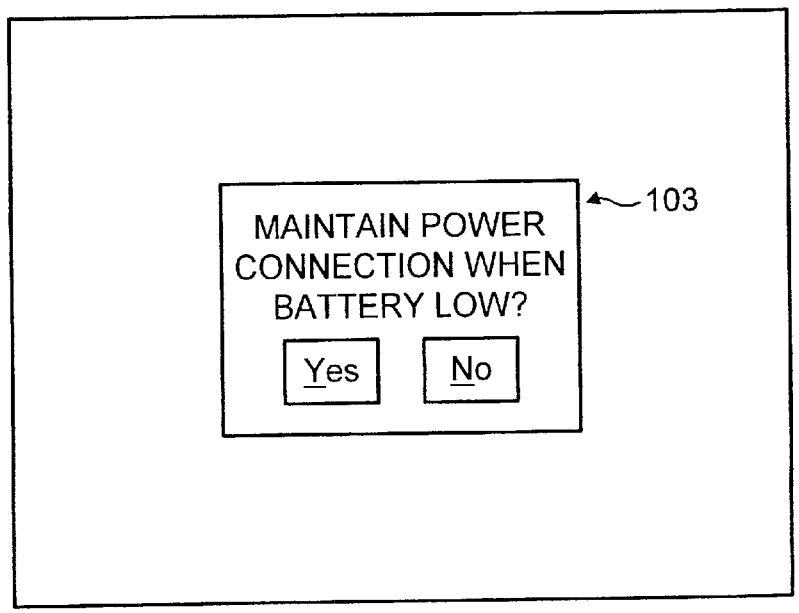
FIG. 9 is a similar view showing a simplified menu.

Again, where ease of use is required and a minimal change to an otherwise conventional UI is desired, then an option box 103 (FIG. 9) is generated on the laptop computer display. This box provides only the first of the above described options in that the only option provided is that of maintaining a power connection in an emergency at the expense of the laptop battery.

It will be understood from the foregoing that the programming of the various user interfaces is within the ability of those skilled in the art and the precise implementation will depend to some extent on the hardware.

Figure 4:
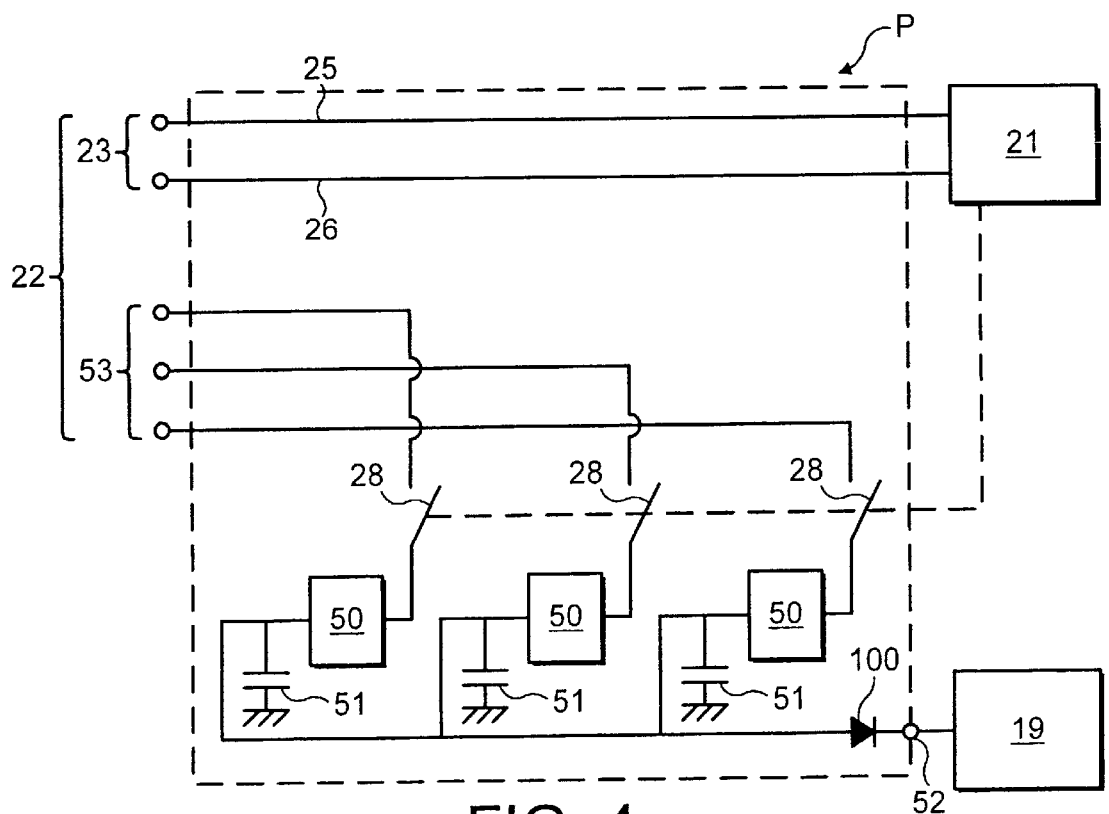
FIG. 4 is a diagrammatic view of a variant of the port of FIG. 3.
Figure 5:
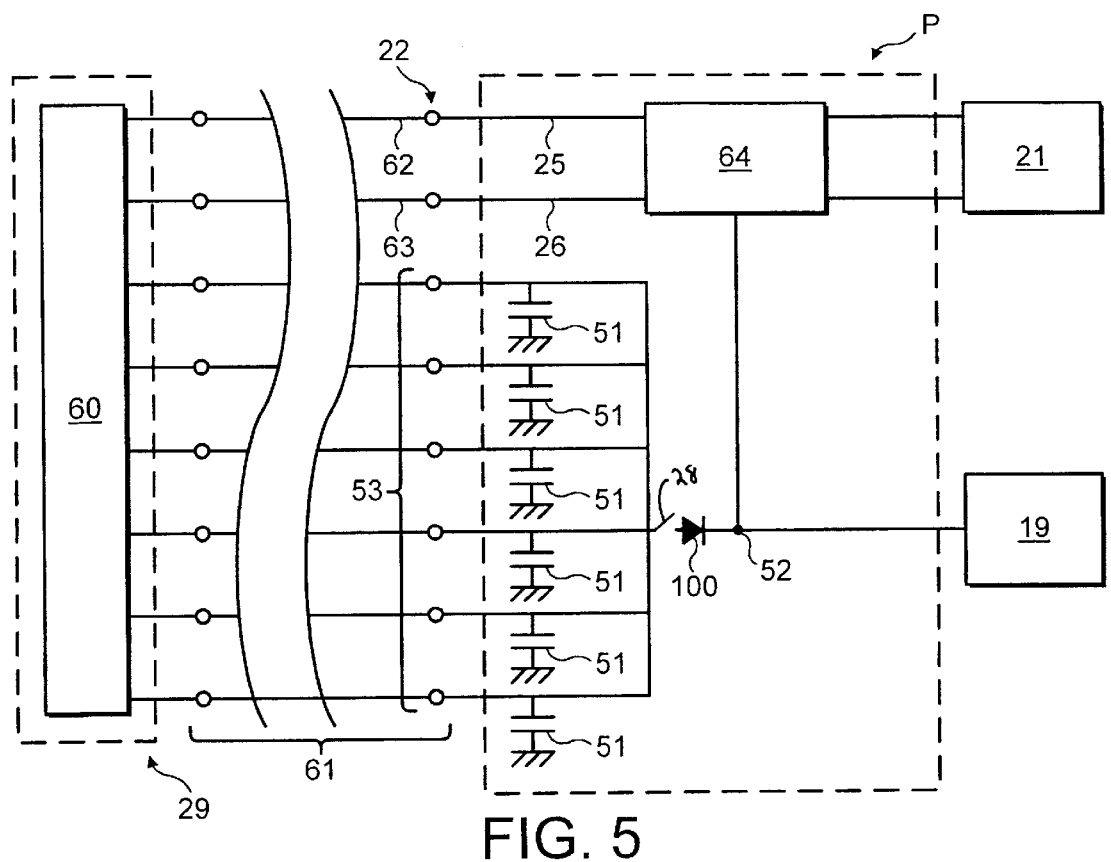
FIG. 5 is a diagrammatic view of a further variant of the port of FIG. 4.

Using the same reference numerals to identify corresponding elements, FIGS. 3, 4 and 5 respectively illustrate a further embodiment of the invention and two variants thereof. In FIG. 3, there is shown a serial port P of a battery-powered handset 14. A pair of data terminals 23 are connected internally to the interface ASIC 21 by conductors 25,26 and are also connectable, via suitable cabling, to a serial port (not shown) of a laptop computer for example. Each conductor 25,26 is tapped, via a switch 28, to a respective logic detector 50. The switches 28 are operable under the condition of the interface ASIC 21. A connection from the output of each detector 50 is made to a corresponding reservoir capacitor 51. The capacitors 51 themselves are connected in parallel and supply a power or charging terminal 52 via a diode 100 with current of some tens of milliamps at a typical voltage of around five volts. The charging terminal 52 is connected to the battery charging circuit 19 as previously described above.

In use, the data terminals 23 are connected via suitable cabling to a communications port of another device such as a laptop computer, for example. As is well known, the data lines of a serial connection are held high when the connection is inactive and will vary between a high and low state whilst communication over the ports takes place. Thus, each logic detector 50 detects the state of a corresponding line 25,26 and, where the state is found to be high, permits current to flow into a corresponding capacitor 51. The output from each capacitor 50 supplies the charging terminal 52 which is connected to the battery charging circuit 19. In order to disable the supply of current to the charging terminal 52, the switches 28 may be opened at the command of the interface ASIC 21. Aside from reasons set out above in relation to the UI of the handset 14, such a step may be necessary if the additional capacitance 52 is having a detrimental effect on the data rate of the port P.

In a variant of the embodiment shown in FIG. 4, rather than using the data lines 25,26 to supply power to the charging circuit 19 the control lines 53 are utilised instead. Such an arrangement is possible where XON/XOFF logic, for example, is being employed to control communication over the data lines 25,26 of the port P. In which case, the control lines 53 are redundant. Consequently, the logic state of these lines 53 can be held high and they can then be used to supply a charging terminal 52 with current. Furthermore, the presence of additional capacitance in the control lines 53 should not have any detrimental effect on the data rate over the data lines 25,26. Nevertheless, to enable charging to be placed under software control, a switch 28 controlled by the interface ASIC 21 is provided. The provision of switching for the control lines is advantageous in that it the capacitance mentioned above can be temporarily removed during a communications session where the control lines are utilised.

FIG. 5, shows a further variant of the further embodiment in which a parallel port 60 of an external device such as a laptop computer 29 is used to communicate with a serial port P of the communications device. A parallel connector 22 on the handset 14 provides connections to an external parallel cable 61 of which two lines carry received and transmitted data 62,63 respectively to the parallel port 60 of the laptop 29. The remaining lines 53 of the cable 61 are unused and are thus held high in accordance with usual practice. Internal connections 25,26 from the connector 22 are made to a parallel to serial conversion block 64 in which parallel communication signals received from the external device 29 are translated to serial signals and vice versa for signals transmitted from the handset 14. The conversion block 64 includes a number of ICs (not shown) which are supplied with power from the power terminal 52 connected to the reservoir capacitors 51 supplied by the unused data/control lines 53 in the manner described previously. In addition, the power from the terminal 52 is used to supply the battery charging circuit 19 of the handset 14.

It will be recognized that although the further embodiment and its variants differ in the manner in which power is derived from the port for charging the battery, it is within the ability of those skilled in the art to adapt the user interface (UI) described in relation to the first embodiment. Furthermore, it will be appreciated that the approach set out in the further embodiment and its variants to deriving power from the data and/or control lines could be used to supplement the power obtained from a dedicated power line such as that described in relation to the first embodiment. Finally, although the foregoing embodiments have illustrated the invention in the context of mobile station such as a handset, the invention could, of course, be applied to any battery powered device having a charging circuit and a communication port such as a handheld computer console, a bar code reader and data capture device or the like.

What is claimed is:

1. A battery powered apparatus comprising:
   a charging circuit for charging a rechargeable battery;
   a processor for controlling the battery operated apparatus and for communicating with an external electronic device including an electrical power supply;
   at least one conductor for connection to the external electronic device which receives data or control signals including when the charging circuit charges the rechargeable battery;
   a user input for receiving a user command;
   means for determining if charging the rechargeable battery using the electrical power supply of the external electronic device is allowed, based on the user command; and wherein
   the charging circuit receives electrical power from the electrical power supply of the external electronic device through the at least one conductor and charges the battery with the received electrical power if the charging of the rechargeable battery using the electrical power supply of the external electronic device is allowed.

2. A battery operated apparatus according to claim 1 wherein:
the means for determining if charging the rechargeable battery using the electrical power supply of the external electronic device is allowed uses the received data or control signals as a basis for the determination.

3. A battery operated apparatus according to claim 2, comprising:
a switch operable to disconnect the charging circuit from the electrical power supply.

4. A battery operated apparatus according to claim 3, wherein:
the at least one conductor comprises a universal serial bus port.

5. A battery operated apparatus according to claim 2, wherein:
the at least one conductor comprises a universal serial bus port.

6. A battery operated apparatus to claim 1, comprising:
the user input is a user interface for receiving the user command; and wherein
the means for determining if charging the rechargeable battery using the electrical power supply of the external electronic device is allowed uses the user interface during the determination if charging is allowed.

7. A battery operated apparatus according to claim 6, comprising:
a switch operable to disconnect the charging circuit from the electrical power supply.

8. A battery operated apparatus according to claim 7, wherein:
the at least one conductor comprises a universal serial bus port.

9. A battery operated apparatus according to claim 6, wherein:
the at least one conductor comprises a universal serial bus port.

10. A battery operated apparatus according to claim 1, wherein:
the at least one conductor comprises at least one electrical power line conductor and the received electrical power is derived from the external electronic device through the at least one electrical power line conductor and the charging of the battery with the received electrical power is derived from the at least one electrical power line conductor.

11. A battery operated apparatus according to claim 10, wherein:
the charging circuit comprises a connector which provides an electrical connection with the electrical power supply.

12. A battery operated apparatus according to claim 11, comprising:
a switch operable to disconnect the charging circuit from the electrical power supply.

13. A battery operated apparatus according to claim 12, wherein:
the at least one conductor comprises a universal serial bus port.

14. A battery operated apparatus according to claim 11, wherein:
the at least one conductor comprises a universal serial bus port.

15. A battery operated apparatus according to claim 10, comprising:
a switch operable to disconnect the charging circuit from the electrical power supply.

16. A battery operated apparatus according to claim 15, wherein:
the at least one conductor comprises a universal serial bus port.

17. A battery operated apparatus according to claim 10, wherein:
the at least one conductor comprises a universal serial bus port.

18. A battery operated apparatus according to claim 1, comprising:
a switch operable to disconnect the charging circuit from the electrical power supply.

19. A battery operated apparatus according to claim 18, wherein:
the at least one conductor comprises a universal serial bus port.

20. A battery operated apparatus according to claim 1, wherein:
the at least one conductor comprises a universal serial bus port.

21. A battery powered apparatus comprising:
a charging circuit for charging a rechargeable battery;
a processor which controls the battery operated apparatus and communicates with an external electronic device including an electrical power supply;
at least one conductor for connection to the external electronic device which conducts data or control signals from the external electronic device when the charging circuit is charging the rechargeable battery; and wherein
the charging circuit derives electrical power from the data or control signals conducted on the at least one conductor from the external electronic device for charging the rechargeable battery.

22. A battery operated apparatus according to claim 21, wherein:
the charging circuit comprises means for providing electrical power from the data or control signals conducted on the at least one conductor from the external electronic device to the rechargeable battery.

23. A battery operated apparatus according to claim 22 wherein the means for obtaining electrical power comprises:
at least one capacitor.

24. A battery operated apparatus according to claim 23 wherein:
the at least one conductor comprises a universal serial bus port.

25. A battery operated apparatus according to claim 24 comprising:
means for determining if charging the rechargeable battery using the electrical power supply of the external electronic electronics device is allowed which uses received data or control signals as a basis for the determination.

26. A battery operated apparatus according to claim 24, wherein:
the at least one conductor comprises at least one electrical power line conductor and the received electrical power is derived from the external electronic device through the at least one electrical power line conductor and the charging of the battery with the received electrical power is derived from the at least one electrical power line conductor.

27. A battery operated apparatus according to claim 23 comprising:

means for determining if charging the rechargeable battery using the electrical power supply of the external electronic electronics device is allowed which uses received data or control signals as a basis for the determination.

28. A battery operated apparatus according to claim 23, wherein:

the at least one conductor comprises at least one electrical power line conductor and the received electrical power is derived from the external electronic device through the at least one electrical power line conductor and the charging of the battery with the received electrical power is derived from the at least one electrical power line conductor.

29. A battery operated apparatus according to claim 23, comprising:

a switch operable to disconnect the charging circuit from the electrical power supply.

30. A battery operated apparatus according to claim 22 wherein:

the at least one conductor comprises a universal serial bus port.

31. A battery operated apparatus according to claim 30 comprising:

means for determining if charging the rechargeable battery using the electrical power supply of the external electronic electronics device is allowed which uses received data or control signals as a basis for the determination.

32. A battery operated apparatus according to claim 30, wherein:

the at least one conductor comprises at least one electrical power line conductor and the received electrical power is derived from the external electronic device through the at least one electrical power line conductor and the charging of the battery with the received electrical power is derived from the at least one electrical power line conductor.

33. A battery operated apparatus according to claim 30, comprising:

a switch operable to disconnect the charging circuit from the electrical power supply.

34. A battery operated apparatus according to claim 22 comprising:

means for determining if charging the rechargeable battery using the electrical power supply of the external electronic electronics device is allowed which uses received data or control signals as a basis for the determination.

35. A battery operated apparatus according to claim 22, wherein:

the at least one conductor comprises at least one electrical power line conductor and the received electrical power is derived from the external electronic device through the at least one electrical power line conductor and the charging of the battery with the received electrical power is derived from the at least one electrical power line conductor.

36. A battery operated apparatus according to claim 22, comprising:

a switch operable to disconnect the charging circuit from the electrical power supply.

37. A battery operated apparatus according to claim 21 wherein:

the at least one conductor comprises a universal serial bus port.

38. A battery operated apparatus according to claim 37 comprising:

means for determining if charging the rechargeable battery using the electrical power supply of the external electronic electronics device is allowed which uses received data or control signals as a basis for the determination.

39. A battery operated apparatus according to claim 37, wherein:

the at least one conductor comprises at least one electrical power line conductor and the received electrical power is derived from the external electronic device through the at least one electrical power line conductor and the charging of the battery with the received electrical power is derived from the at least one electrical power line conductor.

40. A battery operated apparatus according to claim 37, comprising:

a switch operable to disconnect the charging circuit from the electrical power supply.

41. A battery operated apparatus according to claim 21 comprising:

means for determining if charging the rechargeable battery using the electrical power supply of the external electronic electronics device is allowed which uses received data or control signals as a basis for the determination.

42. A battery operated apparatus according to claim 41, wherein:

the charging circuit comprises a connector which provides an electrical connection with the electrical power supply.

43. A battery operated apparatus according to claim 21, wherein:

the at least one conductor comprises at least one electrical power line conductor and the received electrical power is derived from the external electronic device through the at least one electrical power line conductor and the charging of the battery with the received electrical power is derived from the at least one electrical power line conductor.

44. A battery operated apparatus according to claim 21, comprising:

a switch operable to disconnect the charging circuit from the electrical power supply.

* * * * *